PREPARED PHOTOSENSITIVE PLATE

DEVELOPED PLATE

DIELECTRIC FILLER ADDED

COMPLETED DISPLAY

INVENTOR.
WILLIAM BROOKS
ATTORNEYS

March 21, 1967     W. BROOKS     3,310,703
ELECTROLUMINESCENT DEVICE AND PHOTO-RESIST
METHOD FOR MAKING THE SAME
Filed Oct. 7, 1964     2 Sheets-Sheet 2
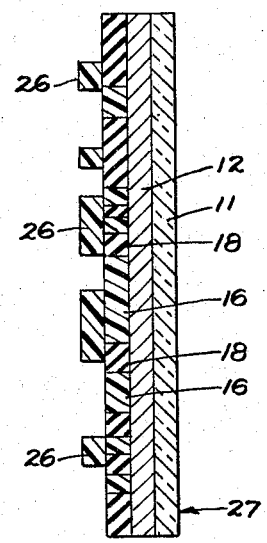
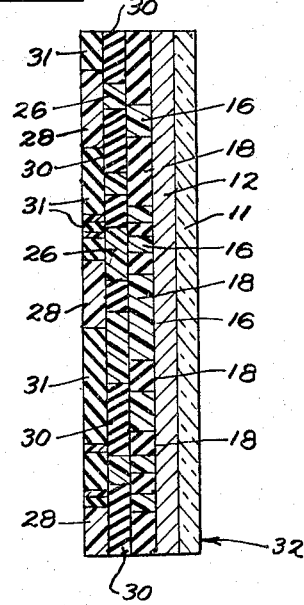
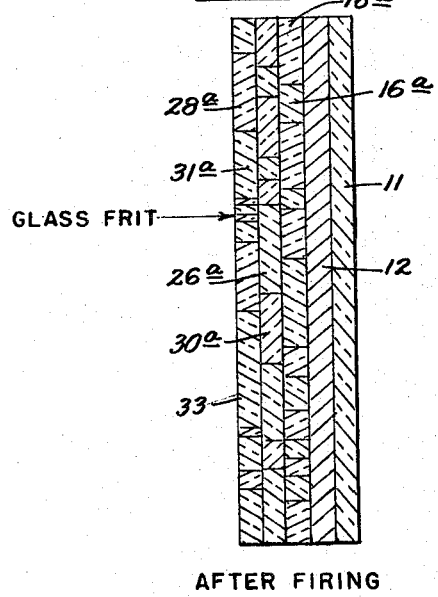
AFTER FIRING
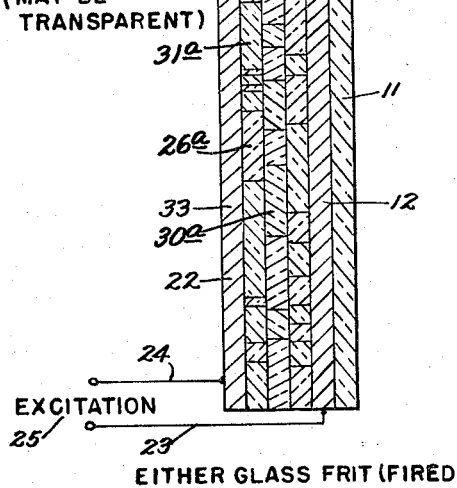
EITHER GLASS FRIT (FIRED)
OR DIELECTRIC FILLER
INVENTOR.
WILLIAM BROOKS
BY
Owen, Wickersham & Erickson
ATTORNEYS

3,310,703
ELECTROLUMINESCENT DEVICE AND PHOTO-RESIST METHOD FOR MAKING THE SAME
William Brooks, 1042 Inverness,
Sunnyvale, Calif. 94087
Filed Oct. 7, 1964, Ser. No. 402,104
6 Claims. (Cl. 313—108)

This invention relates to improved electroluminescent devices and to an improved method for making them.

In an electroluminescent device, light is produced by directly applying voltage across a phosphor or by placing a phosphor in an electric field. The light is emitted only at such times when the voltage is changing, so that such devices are most effective with alternating or pulsating current. Typically, a phosphor is placed between two conductors across which a voltage may be applied, the phosphor being embedded in or protected by an insulating dielectric material. Usually at least one of the conductors is transparent, so that the light can be seen through it.

The phenomenon of electroluminescence is potentially useful in displays and advertising, but heretofore its use has been limited to rather coarse-resolution applications, such as lettering and simple symbols, outlines, or configurations. This limitation arose from the limitations of the methods of putting the phosphor onto the transparent electrode. Thus, phosphor paint (phosphor powder carried in a suitable dielectric binder material) has been applied to the transparent electrode by spraying, printing, or silk-screening, and none of these methods of application was capable of high resolution; for example, silk screens cannot print finer than the cloth weave.

An object of the present invention is to increase the usefulness of electroluminescent devices by providing a method for making them capable of very high resolution, so that fine lines, complex figures, and halftone photographs are readily produced.

Another object of the present invention is to provide multicolored electroluminescent devices, including electroluminescent reproductions of color photographs and various patterns in full color. Prior art attempts to obtain these results have tried using uniform dots in three colors and have dispersed the dots evenly over a screen, relying on non-uniform excitation. In contradistinction, the present invention enables the use of phosphor dot patterns like those used in color printing processes, where dots of varying size are applied in a non-uniform pattern. Then substantially uniform excitation can be used to produce the effect of over-all color, shades, and gradations.

Another difficulty with electroluminescent devices heretofore has been that they have often required opaque backing. The present device makes it practical to use an entirely transparent backing, so that only the phosphor itself is opaque.

Other objects and advantages of the invention will appear from the following description of some embodiments thereof.

In the drawings:

FIG. 6 is a view similar to FIG. 3 showing the application of a second coating for a multicolor device.

FIG. 7 is a view of a later stage in that procedure.

FIG. 8 is a view similar to FIG. 7 showing a later stage in the device, in which glass frit is applied.

FIG. 9 is a view of the completed device of FIGS. 6–8 having three colors of phosphor.

In the present invention, phosphor is deposited, one color at a time, embedded in a dielecetric film of photosensitive resin. Each color is deposited in a separate film; then its resin is exposed and developed to provide a phosphor image, and the remainder of the resin and phosphor is washed off. When multicolored displays are desired, this process is repeated for each of various colors, and between the layers of photosensitive resin a dielectric filler is added to provide a smooth surface for the succeeding layer of photosensitive resin loaded with phosphor.

Figure 1:
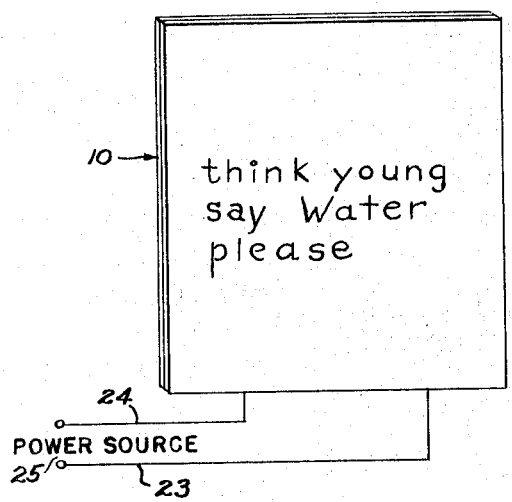
FIG. 1 is a view in perspective of an electroluminescent device embodying the principles of the invention.
Figure 2:
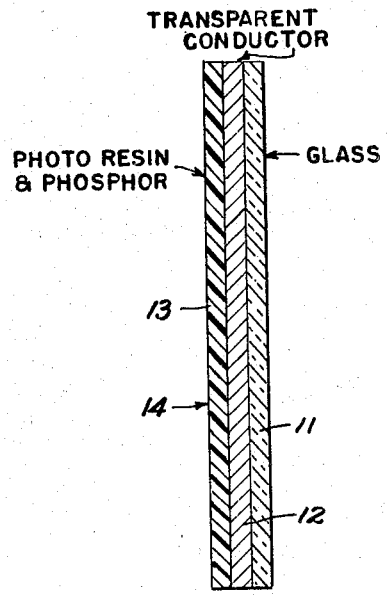
FIG. 2 is a view in elevation and in section, with greatly exaggerated thicknesses and not to scale, of an early stage in the manufacture of the device of FIG. 1.
Figure 3:
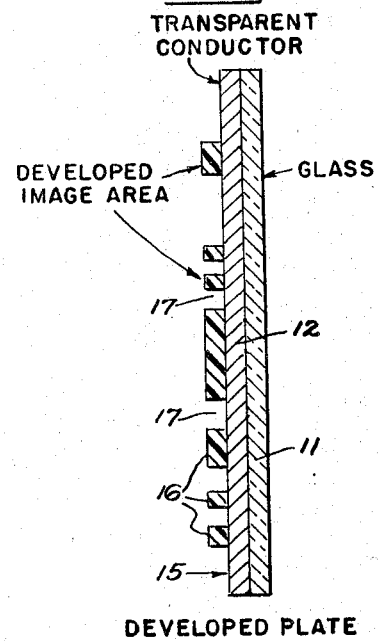
FIG. 3 is a view similar to FIG. 2 showing a later stage in which an image has been developed.

As an example, an electroluminescent device 10 in FIG. 1 may be made by the steps illustrated by FIGS. 2–5. A transparent base 11 (typically glass or plastic) is evenly coated with a transparent conductor 12, such as tin oxide (stannic oxide) or chloride or indium oxide or a thin evaporated metal film such as gold, or thin tin or silicon, or titanium dioxide or any other such material. When the conductor 12 is hard, I then apply a coating 13 of transparent photosensitive resin containing phosphor. The resin may be any of the well-known photoresists made by several manufacturers, and the phosphor may be any of the well-known phosphors, such as green phosphor. Colors may be obtained by using different colored phosphors or by using different fluorescent dyes that are excited by the emission of the phosphor. For example, a red electroluminescence may be obtained by mixing the green phosphor with a dye which is excited to red fluorescence by the green emission of the phosphor. Similarly, blue and yellow electroluminescence may be obtained, as may other colors. The phosphor (with or without dye) is finely powdered and is thoroughly mixed with the photo resist, so that the coating 13 is uniform in composition. The coating 13 is applied in any desired concentration by spraying, painting, printing, or other suitable means onto the transparent conductor 12. The result is the photosensitive phosphor plate 14, shown in FIG. 2.

After the coating 13 is dry, the plate 14 is exposed, just like any such photographic plate of the photo-resist type, to give a latent image. Contact or projection printing may be used, for example, preferably with a line or half-tone negative, since photo-resist is better used in high contrast work rather than the fine gradations used in continuous tone emulsions. When the resin is developed just as in standard photo-resist practice, developed resin remains in the desired exposed areas, and in the other, unexposed, areas the resin and the phosphor it carries are removed by the developer. In an exposed and developed plate 15, shown in FIG. 3, hardened, non-photosensitive resin 16 holds the phosphor (and dye, if used) particles in a picture determined by the exposure. Since the photosensitive resin 13 has a very high resolution, very fine lines and dots of the final coating 16 may be formed from halftone reproductions of continuous tone photographs or from other fine resolutions. The resultant image 16 is thin, uniform, and without the fabric weave patterns produced in silk screen work, nor is there any smear because there is no creeping of wet paint in this process.

Figure 4:
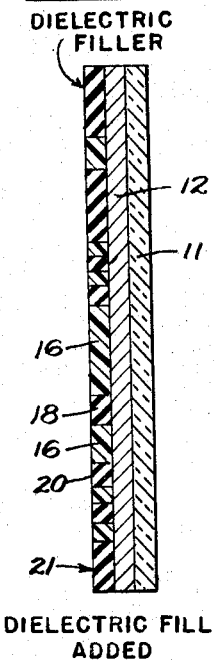
FIG. 4 is a view similar to FIG. 2 showing a still later stage in which a dielectric filler has been added.
Figure 5:
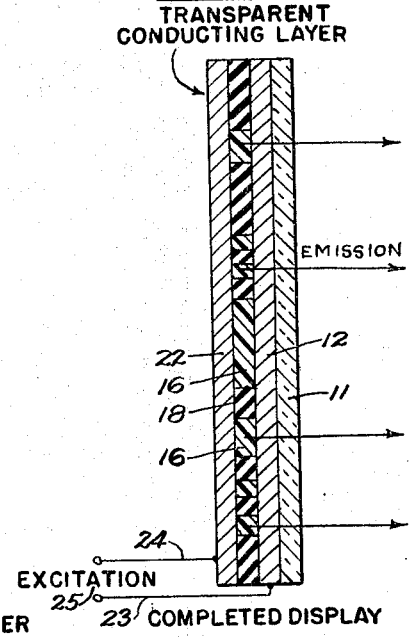
FIG. 5 is a view similar to FIG. 4 of the completed device.

The gaps 17 between the areas of hardened photosensitive resin 16 containing the phosphor are preferably filled in with a film 18 of non-conducting clear insulator or dielectric material as shown in FIG. 4, such as clear melamine, polystyrene, or epoxy plastic. The film 18 may be applied by coating, knife-coating, or spraying, so that the insulator is built up to the same thickness as the phosphor-containing layer 16 or a very thin coat may be placed over the phosphor layer, giving a smooth, level surface 20, and producing a plate 21 to which a rear electrode 22 may be applied, as shown in FIG. 5. Wires 23 and 24 are connected respectively to the conductors 12 and 22 and to a suitable (pulsating) power or excitation source 25.

The rear electrode 22 may be made in any of several forms. To get a transparent sign 10, that is, a sign that is transparent in between the electroluminescent display elements 16, the electrical connections should not be apparent from the front surface of the display. A transparent conductor 22 may be formed over the level smooth surface 20 created by the resin 18 and dielectric coating 16 by vacuum evaporation of metals, by using semitransparent metallic layers of gold or tin for example, or by applying silver chloride or similar material such as used in producing mirrors. If the display contains solid areas such as letters, very thin conductors such as fine wires may be attached to each letter, which has a rear electrode of the same shape and size as the letter and would therefore not be visible from the front of the display. If even fine wires are objectionable for a particular display, then fine glass cane coated with a transparent conductor such as tin oxide may be used.

Instead of using only a single color, the plate 21 of FIG. 4 may be coated with a layer 26 of photosensitive resin containing a phosphor which emits a different color or excites a fluorescent dye to a different color. The resulting plate 27 may then be exposed to a selected image (or half tone color separation negative) to give a two-color phosphor pattern upon development, as shown in FIG. 6. With color separation masks, such as are used in full color half tone reproduction, a full color phosphor photograph may be formed, as illustrated diagrammatically in FIG. 7, where three color layers 16, 26, and 28 have been developed, each filled with dielectric 18, 30, and 31 to give a plate 32. Various shades of the same color may also be produced by controlling the dot size. After the final application of the final color 28, the base may be filled in with the non-conducting clear insulator 31 and the rear electrode 22 applied.

If desired, the hardened photosensitive resin areas 16, 26, and 28, containing the different-color phosphor mixtures, can be treated as only a temporary binder. For this purpose the developed image can at each stage be sprayed with a glass frit solution to fill in the areas between the display elements 16, 26, and 28 with glass frit as dielectric 18a, 30a, and 31a and to a thickness slightly greater than the display elements. Then the plate is fired in a furnace at a temperature which melts the frit (which has a melting point below the degrading temperature of the phosphor) and also burns away the photoresin, leaving display elements 16a, 26a, and 28a separated by the dielectric. As a result, the glass frit fuses to form a display of all-glass construction with a smooth level rear surface 33 suitable for the application of the rear electrode system 22 (FIGS. 8 and 9). This all-glass device is desirable, for the display is sealed and moisture cannot therefore affect the phosphor.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method of making an electroluminescent device of the type in which a field-responsive phosphor is interposed between two electrically conductive layers, at least one of which transmits light, including the steps of depositing on one said conductive layer a dielectric film of photosensitive resin with phosphor dispersed therein, photographically exposing said resin to produce a desired latent image, developing said resin to harden the phosphor-containing resin of said latent image and to eliminate the remainder of said resin with its contained phosphor, filling the spaces left by said elimination with a dielectric non-phosphor bearing film to provide a smooth outer surface, and placing the second said conductive layer on said outer surface.

2. A method of making an electroluminescent device of the type in which a field-responsive phosphor is interposed between two electrically conductive layers, at least one of which transmits light, including the steps of depositing on one said conductive layer a dielectric film of photosensitive resin with phosphor dispersed therein, photographically exposing said resin to produce a desired latent image, developing said resin to harden the phosphor-containing resin of said latent image and to eliminate the remainder of said resin with its contained phosphor, replacing said resin by glass while leaving the position of said phosphor substantially unchanged, and placing the second said conductive layer over said glass.

3. A method of making a multicolor electroluminescent device of the type in which field-responsive phosphors are interposed between two electrically conductive layers, at least one of which transmits light, including the steps of depositing on one said conductive layer a first dielectric film of photosensitive resin-phosphor mix that, when said phosphor is excited, produces a first color, photographically exposing said resin to produce a desired first latent image, developing said resin to harden the phosphor-containing resin of said first latent image and to eliminate the remainder of said phosphor-containing resin, filling the spaces left by said elimination with a dielectric non-phosphor bearing film to provide a smooth surface, depositing on said developed resin a second like film which, when its phosphor is excited, produces a second color, and exposing and developing said second film, said films being deposited, exposed, and developed one at a time until a desired total number of films, each having a different excited color, is reached, each film having its spaces filled by a said dielectric non-phosphor bearing film to provide a said smooth surface, and placing the second said conductive layer on the topmost said smooth surface.

4. An electroluminescent device of the type in which a field-responsive phosphor is interposed between two electrically conductive layers, at least one of which transmits light, characterized by said phosphor being contained in an exposed and developed photosensitive resin to provide an image in which said phosphor is dispersed.

5. An electroluminescent device of the type in which field-responsive phosphor is interposed between two electrically conductive layers, at least one of which transmits light, characterized by a plurality of phosphor layers differing in the color which they produce when excited, each phosphor layer being contained in a separately exposed and developed photosensitive resin.

6. An electroluminescent device of the type in which a field-responsive phosphor is interposed between two electrically conductive layers, at least one of which transmits light, characterized by said phosphor being dispersed in a plurality of half-tone type dots differing widely in size and distributed non-uniformly so as to produce an image when said phosphor is electrically excited.

References Cited by the Examiner

UNITED STATES PATENTS

| | | | |
|---|---|---|---|
| 2,730,644 | 1/1956 | Michlin | 313—108 |
| 2,992,919 | 7/1961 | Beeler et al. | 96—118 |
| 3,201,633 | 8/1965 | Lieb | 313—108 |

JAMES W. LAWRENCE, *Primary Examiner.*

R. JUDD, *Assistant Examiner.*